United States Patent [19]
Checa

[11] Patent Number: 5,205,387
[45] Date of Patent: Apr. 27, 1993

[54] HYDRAULIC ACTUATOR FOR A FRICTION CLUTCH

[75] Inventor: Eduardo A. Checa, Murcia, Spain

[73] Assignee: Valeo, Cedex, France

[21] Appl. No.: 854,391

[22] Filed: Mar. 19, 1992

[30] Foreign Application Priority Data

Mar. 22, 1991 [FR] France .................. 91 03489

[51] Int. Cl.⁵ ............................................. F16D 25/08
[52] U.S. Cl. .............................. 192/85 CA; 192/89 B; 192/91 A
[58] Field of Search ............. 192/85 CA, 91 A, 98, 192/89 B

[56] References Cited

U.S. PATENT DOCUMENTS

| | | | |
|---|---|---|---|
| 2,668,610 | 2/1954 | Backus | 192/91 A |
| 3,907,085 | 9/1975 | Rist | 192/85 CA X |
| 4,362,230 | 12/1982 | Corral | 192/109 R |
| 4,456,111 | 6/1984 | Limbacher | 192/98 X |
| 4,585,106 | 4/1986 | Shirley | 192/98 X |
| 4,620,625 | 11/1986 | Ladin | 192/85 CA |
| 4,687,084 | 8/1987 | Leigh-Monstevens et al. | 192/85 CA |
| 4,708,228 | 11/1987 | Leigh-Monstevens | 192/98 X |
| 4,869,355 | 9/1989 | Corral et al. | 192/85 CA X |
| 4,995,492 | 2/1991 | Babcock et al. | 192/85 CA |
| 5,062,515 | 11/1991 | Cimarosti | 192/85 CA X |
| 5,083,649 | 1/1992 | Baer | 192/85 CA X |

FOREIGN PATENT DOCUMENTS

| | | | |
|---|---|---|---|
| 451611 | 10/1948 | Canada | 192/85 CA |
| 0092823 | 11/1983 | European Pat. Off. . | |
| 0341082 | 11/1989 | European Pat. Off. . | |
| 2115443 | 11/1971 | Fed. Rep. of Germany | 192/91 A |
| 2651846 | 3/1991 | France . | |
| 1255002 | 11/1971 | United Kingdom | 192/91 A |
| 1323794 | 7/1973 | United Kingdom . | |
| 2051291 | 1/1981 | United Kingdom . | |
| 2088010 | 6/1982 | United Kingdom | 192/91 A |
| 2098697 | 11/1982 | United Kingdom | 192/91 A |
| 2116283 | 9/1983 | United Kingdom | 192/91 A |
| 2147668 | 5/1985 | United Kingdom . | |

Primary Examiner—Rodney H. Bonck
Assistant Examiner—Andrea Pitts
Attorney, Agent, or Firm—Longacre & White

[57] ABSTRACT

A hydraulic actuator of a motor vehicle friction clutch comprises a cylinder and a piston defining between them a control chamber. The cylinder and piston are hollow, and mounted concentrically with respect to each other, with the cylinder surrounding the piston and abutting at its leading end on a bearing carried by the clutch cover plate, the cylinder having slots for preventing it from rotating with respect to a fixed part of the vehicle. The piston cooperates with the fixed ring of a rolling bearing of an actuating element which acts in traction on the declutching member of the clutch.

13 Claims, 1 Drawing Sheet

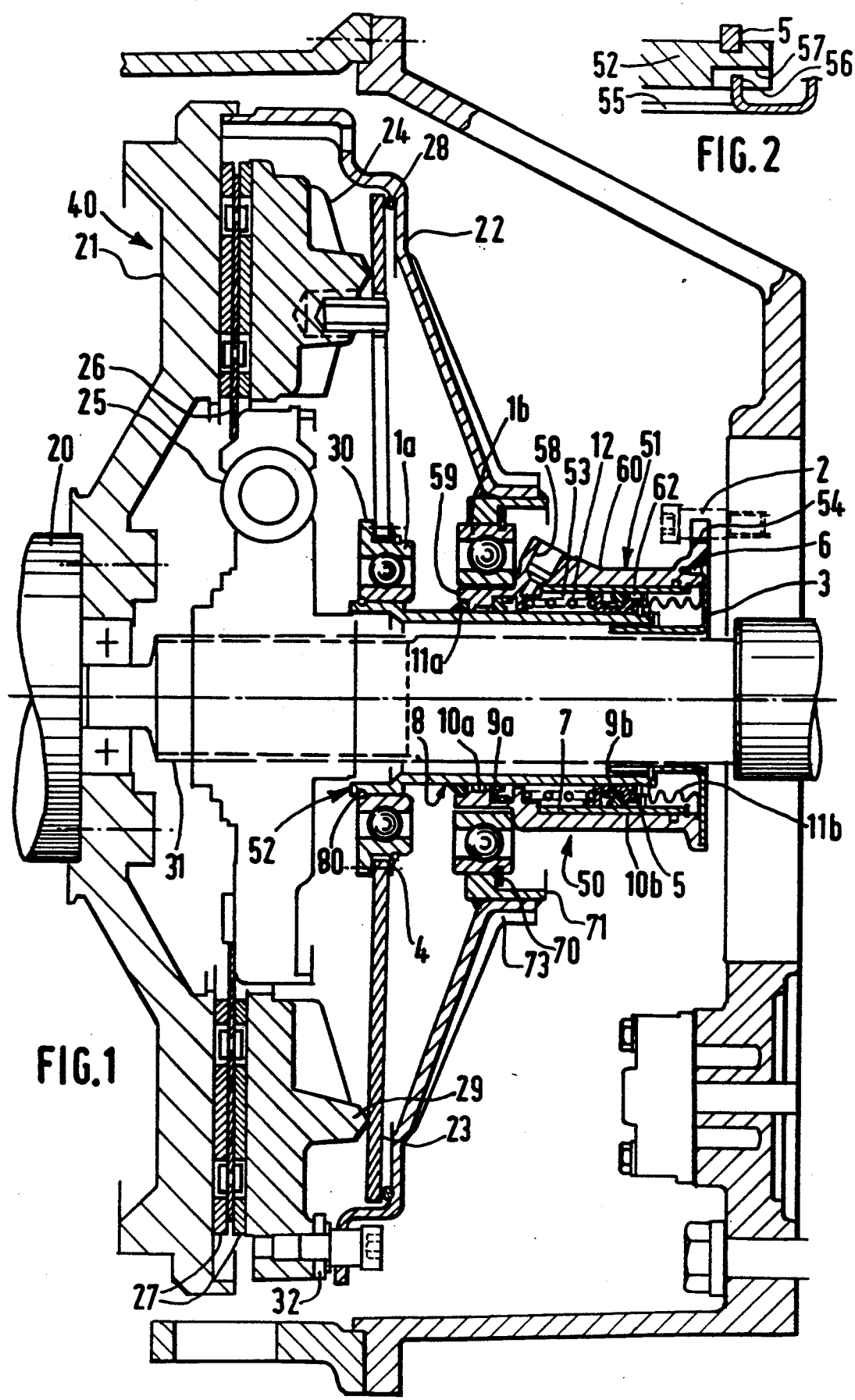

HYDRAULIC ACTUATOR FOR A FRICTION CLUTCH

FIELD OF THE INVENTION

The present invention relates to a hydraulic actuator associated with a friction clutch, in particular for a motor vehicle, for actuating the clutch in a pull-off mode, the said actuator including a cylinder and a piston which are fixed against rotation with respect to each other and which are adapted respectively to engage in axial thrust relationship on a bearing carried by a cover plate of the clutch, and to act in traction on the declutching means of the clutch, with the piston and cylinder together defining a control chamber for fluid actuation of the clutch.

BACKGROUND OF THE INVENTION

An arrangement as defined above is described in the specification of U.S. Pat. No. 3,907,085 and the corresponding French published patent application No. FR 2 216 856A. That arrangement enables the forces exerted during a declutching operation on the reaction plate of the clutch and on the crankshaft bearings of the vehicle to be minimised. Such an arrangement is applicable to a removable unit comprising at least two cylinders and two pistons, together with a stirrup-shaped casing which may be fitted by simple engagement on a sleeve.

In some cases it may be desirable to use an arrangement having only one piston and one cylinder, arranged concentrically with respect to the shaft which is driven by the clutch when the latter is engaged. In order to satisfy this requirement, an arrangement such as that described in the specification of United Kingdom published patent application No. GB 2 147 668A may be employed. As disclosed in that specification, the cylinder is coupled in rotation with the cover plate of the clutch, with rotary seals being provided between the cylinder and the fluid supply means, the latter being the means for supplying hydraulic fluid for the actuator so as to fill the control chamber defined by the cylinder and piston of the actuator.

However, such an arrangement is complicated and gives rise to sealing problems which can be detrimental to the useful life of the actuator.

DISCUSSION OF THE INVENTION

An object of the present invention is to overcome the above drawbacks, and thus to provide a novel actuator of the concentric type not having rotary seals, but still preserving the advantages of the arrangements known from the prior art.

According to the invention, there is provided a hydraulic actuator associated with a friction clutch, in particular for a motor vehicle, for operating the clutch in a tractive mode, the said actuator comprising a cylinder having a leading end portion, together with a piston, the said cylinder and piston being fixed in rotation to each other and being adapted respectively to bear axially on a bearing carried by a cover plate of the clutch, and to act on the declutching mechanism of the clutch, characterised in that the cylinder and the piston are of hollow tubular form and are mounted concentrically with each other with the said cylinder surrounding the piston, in that the cylinder is adapted to bear through its leading end portion on the bearing carried by the said cover plate of the clutch, with the cylinder carrying first rotation stop means for preventing it from rotating with respect to a fixed part, and in that the said piston projects axially beyond the leading end portion of the cylinder and is adapted to cooperate with the fixed bearing ring of a bearing forming part of an actuating element for acting in traction on the declutching mechanism of the clutch.

In the arrangement according to the invention the cylinder is fixed against rotation, as is the piston, so that no rotary seal is required for the control chamber defined by the cylinder and piston. In this way the actuator is enabled to have a longer useful life, while having a concentric control means.

It will be appreciated that the dangers of leakage are reduced, so that the actuating fluid is not liable to contaminate the friction liners of the clutch. In addition, the cylinder and piston are both of simplified form. Again, the cylinder has no axial groove and is smaller in the radial direction, by contrast with the arrangements described in, for example, the specification of published European patent application No. EP 0 341 082A.

According to a preferred feature of the invention, the cylinder carries second rotation stop means for preventing rotation of the piston with respect to the cylinder. There is then no relative rotational movement between the cylinder and the piston, so that applied forces on all of the seals of the actuator are relieved.

According to a further preferred feature of the invention, the cylinder is mounted with a radial clearance with respect to the bearing carried by the cover plate of the clutch. An auto-centring system is thus obtained, which avoids the occurrence of radial displacements and corresponding wear, the axis of rotation of the declutching means (for example a diaphragm) not being necessarily coaxial with the bearing carried by the clutch cover plate.

A preferred embodiment of the invention will be described below, by way of example and with reference to the accompanying drawings.

BRIEF DESCRIPTION OF THE DRAWINGS

FIG. 1 is a view in axial cross section showing a diaphragm type friction clutch of the "pull-off" type, with its associated hydraulic actuator in accordance with the invention.

FIG. 2 is a view of part of the second rotation stop means of the clutch assembly.

DESCRIPTION OF A PREFERRED EMBODIMENT OF THE INVENTION

FIG. 1 shows a motor vehicle clutch 40 which comprises an assembly of annular components, namely a reaction plate 21, at least one clutch plate 26 carrying friction liners, at least one pressure plate 24, a cover plate 22, and an axially acting resilient means 23. In this particular example, the clutch has only one clutch plate 26 and one pressure plate 24, but in a modification it may have more than one clutch plate and more than one pressure plate. The reaction plate 21, the pressure plate 24, the resilient means 23 and the cover plate 22 are mounted on a driving shaft 20 for rotation with it. This driving shaft is typically the engine crankshaft of the motor vehicle.

The clutch plate 26 is mounted on the driven shaft 31 of the clutch for rotation with the driven shaft. This driven shaft is in this example the input shaft of the gearbox. As to the cover plate 22, this is typically of the kind described more fully in the specification of French published patent application No. FR 2 579 702A and the corresponding European published patent application No. EP 0 198 747A, both of which correspond to U.S. patent application 07/840,773 filed Mar. 18, 1986, to which reference is invited and which is incorporated by reference in the present description. It will however be convenient here to mention certain aspects of the construction and operation of the cover plate. It is arranged to be secured to the reaction plate 21, for example by means of screws, studs or rivets. The cover plate is also coupled to the pressure plate 24, for rotation therewith but with coupling means being interposed, these coupling means being such as to permit a certain amount of relative axial displacement of the pressure plate 24 with respect to the cover plate 22.

In the present example these coupling means consist of a plurality of tangential tongues 32, together with the axially acting resilient means 23, which in fact consist of a diaphragm in this example. The diaphragm 23 has a peripheral or outer portion defining a Belleville ring, and a central portion which is divided by radial slots into a series of radial fingers. The diaphragm 23 bears, through the outer periphery of its Belleville ring portion, on an annular thrust surface 28 which is carried by the cover plate 22. The diaphragm also bears, through the inner periphery of its Belleville ring portion, on a segmented annular crown or anvil ring 29 which projects axially from, and is integral with, the pressure plate 24.

For further detail, reference is also invited to the specification of U.S. Pat. No. 4,362,230 and the corresponding French published patent application No. FR 2 463 874A. Like FIG. 1 in the present case, those documents disclose the clutch plate 26 coupled to a hub which is mounted for rotation on the driven shaft 31 through a torsion damper 25. The clutch plate carries two friction liners 27, one on each of its opposed faces. The friction liners 27 are arranged to be gripped axially between the pressure plate 24 and the reaction plate 21. More precisely, when the clutch is in the engaged position, the diaphragm 23 bears on the annular thrust surface 28 and the anvil ring 29 so as to urge the pressure plate 24 towards the reaction plate 21 so as to grip the friction liners 27 between the plates 21 and 24. The driving torque is then transmitted from the engine crankshaft 20 to the reaction plate 21 and cover plate 22 (by virtue of the coupling of the latter with the reaction plate 21), the torque then being further transmitted from the friction liners 24 to the hub and to the gearbox input shaft 31 via the torsion damping device 25. This torsion damping device, in this arrangement, comprises generally two guide rings which are arranged axially on either side of a damper plate which is mounted for rotation, typically on the hub. The damper plate and guide rings are formed with apertures aligned with each other, and usually consist of windows in which resilient members are mounted which act between the damper plate and the guide rings. Such an arrangement, while typical, is not essential and other forms of torsion dampers may be used instead.

In order to disengage the clutch, it is necessary to exert a tractive force on the ends of the fingers of the diaphragm, using an actuating element 30. This actuating element 30 acts in traction on the ends of the fingers of the diaphragm, and passes through a central opening in the latter in order to cooperate with the face of the diaphragm that is directed away from the base of the cover plate 22. In the present example, the actuating element 30 is manoeuvred by means of a hydraulic actuator 50, and comprises a bearing 1a having one rotating ring and one fixed ring. In this example the bearing 1a is a ball bearing. The diaphragm 23 is of course part of the declutching mechanism of the clutch 40.

The hydraulic actuator 50 is arranged coaxially with the clutch, and the driven shaft 31 passes through it. This actuator comprises a cylinder 51 and a piston 52 defining a control chamber 53 (in this example a hydraulic chamber) which is delimited by the components 51 and 52. The cylinder 51 is arranged to bear, at its forward end, (defined on its leading end portion indicated at 59), axially on a bearing 1b which is carried by the cover plate 22 of the clutch, while the piston 52, which projects axially beyond the leading end portion 59 of the cylinder 51 (i.e. to the left in FIG. 1), is arranged to act on the declutching mechanimsm of the clutch through the actuating element 30.

As can be seen from FIG. 1, the cylinder 51 and piston 52 are both of hollow tubular form, and are mounted concentrically with each other with the cylinder 51 surrounding the piston 52; while the cylinder 51, engaging at its leading end 59 the bearing 1b carried by the cover plate 22 of the clutch, carries a first rotation stop means 54. This stop means 54 prevents rotation of the cylinder 51 with respect to a fixed part of the clutch assembly and therefore of the vehicle. The piston 52, projecting axially beyond the leading end 59 of the cylinder 51, and arranged to cooperate with the fixed bearing ring of the bearing 1a which is part of the actuating element 30 that acts in traction on the diaphragm 23 of the clutch, thus extends into the bearing 1a and into the clutch 40. The cylinder 51 also carries a second rotation stop means indicated at 3, for limiting rotation of the piston 52 with respect to the cylinder 51.

In this example, the cylinder 51 is formed with a radial flange at its free rear end (i.e. its right hand end as seen in FIG. 1). The first rotation stop means 54 mentioned above comprises two diametrically opposed slots 54 which are formed in the outer periphery of this flange. Each of these slots 54 is arranged to cooperate with a respective one of two screws 2 which are screwed into the fixed casing of the gearbox. The slots 54 have a shape matching that of the cylindrical, unthreaded upper shank portion of each of the screws 2. This arrangement thus provides a rotational coupling of the tenon and mortice type, which enables the cylinder 51 to be displaced axially with respect to the screw 2.

It will of course be understood that the reverse arrangement is possible, in which the cylinder flange carries pegs or dowels which engage with sliding movement in complementary holes formed in the fixed gearbox casing. In a further modification, a coupling may be provided by tangential tongues of the same type as the tongues 32.

The second rotation stop means 3 mentioned above consists, in this example, of a hollow spigot or sleeve member having a radial flange which is secured to the free end of the cylinder 51 by means of screws 6. In a modification, this fastening may be obtained by riveting or welding. The sleeve member 3 comprises a central sleeve portion 55 which extends axially towards the clutch and into the bore of the hollow piston 52. A series of radial lugs 56 are formed in the sleeve portion 55, for example by pressing and bending, the sleeve member 3 being preferably made of metal. Each lug 56 (see FIG. 2) is arranged to cooperate with a complementary slot formed at the right hand end (as seen in FIG. 1) of the bore of the piston 52, i.e. at the end of the latter opposite the end which engages the actuating element 30.

The slots 57 are longer in the axial direction than the lugs 56, so that the piston 52 is able to move axially with respect to the sleeve member 3 while still being coupled with the latter in rotation.

Some other type of coupling can of course be provided instead. For example, the sleeve portion 55 may have a free end which is divided into axial lugs, while the cylinder may carry a collar which extends inwardly towards the axis of the assembly, this collar being formed with slots for sliding cooperation with the lugs of the piston 52.

With these arrangements, the piston 52 is fixed against rotation with respect to the cylinder 51, the latter being itself fixed against rotation with respect to the fixed part of the vehicle which in this example consists of the gearbox casing.

The cylinder 51 and the piston 52 are tubular in this example, with the cylinder 51 surrounding the piston 52 so as to define the control chamber 53 between them. The control chamber 53 is supplied with a hydraulic fluid via a feed inlet 58 formed in the piston 51. The feed inlet 58 includes a connector for connection of a simple tube or pipe, connecting the actuator 50 to, for example, a hydraulic supply cylinder. It should be noted that this pipe may itself constitute the first rotation stop means for the cylinder 51 (in place of the screws 2), especially if this pipe is a rigid tube.

In the present example the internal bore of the cylinder 51 is lined with a tubular slide guide 7 having a chrome plated internal surface. A slide member 62 is secured by means of a circlip 5 on the outer peripheral surface of the piston 52, and is arranged to slide axially along the slide guide 7. The circlip 5 is engaged in a groove formed on the outer surface of the piston 52 close to its free end as shown in FIG. 2, and the leading or left hand end (as seen in FIG. 1) of the control chamber 53 is closed by the slide member 62.

Similarly, the cylinder 51 has an annular guide surface 10a in the region of the bearing 1b. The cylinder 51 is in fact formed as a stepped tube comprising a rear portion 60 of larger diameter, defining the control chamber 53 within it, and the leading end portion 59, which is of smaller diameter and which comprises a shouldered nose portion fitting within the inner ring of the bearing 1b and engaging in axial thrust relationship against this inner ring of the latter by means of its external shoulder. The guide surface 10a is the internal bore of the leading end portion 59. The nose has an internal shoulder facing towards the right as seen in FIG. 1 and defining the leading end or base of the control chamber 53.

The outer surface of the piston 52 has a chromed coating 8, and a preloading resilient means 12 is mounted in the control chamber 53. This preloading resilient means 12 is in the form of a coil spring which bears at one of its ends on the cylinder 51, at the internal shoulder or step which defines the junction between the leading portion 59 and rear portion 60 of the cylinder 51. At its other end, the spring 12 bears on the slide member 62. Thus the spring 12, acting through the slide member 62 and circlip 5, biases the piston 52 into the interior of the cylinder 51, holding the latter in engagement against the bearing 1b and the actuating element 30 against the diaphragm 23. A seal 9b is interposed between the slide member 62 and the slide guide 7, while further seals 9a and 11a are interposed between the outer surface of the piston 52 and the internal surface of the leading end portion 59 of the cylinder 51. The seals 11a and 9a are arranged close to the two ends, respectively, of the leading end portion 59. A protective bellows 11b is secured to the piston 52 and to the sleeve member 3. All of these seals, and the protective bellows, are provided for the purpose of preventing foreign matter from penetrating into the control chamber 53.

In the present example, the bearing 1b is a ball bearing with a rotating outer ring which is provided with a groove in which a circlip 70 is mounted. This circlip 70 engages on a shouldered member 71 which is welded to the cover plate 22, so as to provide external support for the outer ring of the bearing 1b. To this end, the cover plate 22, which is generally in the shape of a hollow plate, has a radially inner base portion which is formed with a coaxial central aperture having an axially oriented annular flange 72 in which the shouldered member 71 is fitted.

There is a radial clearance between the leading end portion 59 of the cylinder 51 and the fixed inner ring of the ball bearing 1b, which thus surrounds the end portion 59 with a radial clearance. The cylinder 51 bears, through the shoulder formed in the nose at the junction between the two portions 59 and 60 of the cylinder 51, on the inner ring of the ball bearing 1b, and more precisely on the radial face of the latter which faces towards the outside of the cover plate 22 and thus away from the diaphragm 23. The spring 12 also maintains the cylinder 51 centred with respect to the ball bearing 1b, the radial displacement of the cylinder 51 being controlled by the spring 12 exerting a tractive force on the piston 52. It will be noted that the load of the spring 12 is so chosen as to be compatible with this automatic centring function for the cylinder 51, while at the same time reducing by the minimum possible amount the load of the diaphragm when the clutch is engaged. The load of the spring 12 depends on the particular application to which the clutch is to be put and particularly on the weight of the cylinder 51 and piston 52.

It will be noted that the piston 52 extends through the internal bore of the diaphragm 23. Accordingly, at its leading end adjacent to the diaphragm 23, the piston has a groove in which a ring 80 is mounted. The ring 80 is arranged to cooperate with the fixed inner ring of the ball bearing 1a of the actuating element 30. The rotating outer ring of the bearing 1a is formed with an annular flange which engages axially on the ends of the fingers of the diaphragm 23, on the side of the latter facing away from the cover plate 22. The outer ring of the ball bearing 1a, extending through the diaphragm, is retained on the ends of the diaphragm fingers by gripping action provided by (in this example) a Belleville ring 4 which bears on a circlip mounted in a groove formed in the outer ring of the ball bearing 1a.

It will be realised that the ring 80 enables the ball bearing 1a to be fitted to the piston 52 axially, in the direction going from the bearing 1a towards the cylinder 51, that is to say in the direction of declutching movement. Thus, in order to disengage the clutch, hydraulic pressure merely needs to be established in the control chamber 53 in order to cause the slide member 62 to be displaced, together with the piston 52, due to the fact that the cylinder 51 is mounted axially on the ball bearing 1b which is itself mounted axially on the cover plate 22 by means of the circlip 70 and shouldered member 71. The increase in pressure in the control chamber 53 causes the piston 52 to move a little further into the cylinder 51 so that a tractive force is exerted on the ball bearing 1a, which causes the diaphragm 23 to tilt.

It will be appreciated that the bearings of the crankshaft 20 are relieved of forces applied by virtue of the declutching operation, as are the fastening members which secure the cover plate 22 to the reaction plate 21 (these fastening members usually consisting of screws), by virtue of the ball bearings 1a and 1b, each of the latter having its respective shoulder for engagement on the cover plate 22 and diaphragm 23 with these shoulders being directed towards each other.

As will also have been understood from the foregoing, because of the provision of the rotation stop means described above, no rotational movement of the piston 52 or cylinder 51 is possible, so that the seals 9a, 9b, 11a, 11b are relieved of applied forces and wear resulting from such rotation, while the supply of hydraulic fluid to the control chamber 53 is facilitated and may be achieved by means of a simple feed tube or pipe.

The arrangement thus enables the declutching fork conventionally provided for a clutch to be eliminated. In addition, as already mentioned, the axial forces between the engine and the gearbox, normally generated in a conventional clutch during the declutching operation, are avoided. In addition, because of the radial clearance between the ball bearing 1b and the leading end portion 59 of the actuator cylinder, any errors in alignment between the axes of the ball bearings 1a and 1b are automatically compensated for since the actuator 50 is of the auto-centring type.

It will be noted that it is for this reason that two screws 2 are provided, with the slots 54 being laterally aligned with the smooth upper shank portion of the screws 2 but being deeper so that some radial displacement is possible between the slots 54 and the screws 2. It will also be understood that the sleeve member 3 defines a kind of labyrinth for the piston 52, thus preventing foreign matter from penetrating to the rear of the piston 52.

The present invention is of course not limited to the embodiment described above, and in particular the ball bearing 1b may be a simple anti-friction bearing. The ball bearing 1a may not extend into the diaphragm, but may for example carry a spigot as seen in FIG. 1 of the U.S. Pat. No. 4,362,230 mentioned above.

Instead of being a diaphragm clutch, the friction clutch may be of the kind having declutching levers associated with coil springs, with the actuating element 30 acting in traction as described above, but on the declutching levers. The cylinder 51 may be mounted with respect to the ball bearing 1b without any radial clearance, so that only one screw 2 and one corresponding slot 54 need then be provided. Similarly, one single lug 56 may be sufficient to prevent the piston 52 from rotating.

Finally, it will be understood that the clutch may be controlled pneumatically instead of hydraulically, and may operate in response to either an increase in control fluid pressure or a decrease in control fluid pressure.

What is claimed is:

1. A motor vehicle clutch assembly comprising a fixed part of a vehicle, a friction type transmission clutch, and means mounting the clutch to said fixed part of the vehicle, the clutch including a cover plate, a first bearing mounted centrally in the cover plate, a declutching means within the cover plate, and an actuating member engaging the declutching means and comprising a second bearing in the form of a rolling bearing having a fixed bearing ring, for acting in traction on the declutching means whereby to disengage the clutch, the clutch assembly further including a fluid operated actuator comprising a hollow tubular cylinder having a leading end portion and a free end, a hollow tubular piston mounted concentrically within the cylinder and capable of axial translation with respect to the cylinder, a central chamber delimited by said cylinder and said piston, and means for preventing relative rotation between the piston and cylinder, the cylinder defining axial thrust means for axial engagement on said first bearing, and the piston having means for engaging the declutching means for acting on the declutching means, wherein said leading end portion of the cylinder is arranged to bear on said first bearing, the actuator further including first rotation stop means carried by the cylinder for preventing rotation of the cylinder with respect to said fixed part, the piston projecting axially beyond said leading end portion of the cylinder for cooperation with said fixed bearing ring of the second bearing.

2. A motor vehicle clutch assembly according to claim 1, wherein the cylinder is formed with at least one slot defining said first rotation stop means.

3. A motor vehicle clutch assembly according to claim 2, further including a screw secured to said fixed part and having a smooth upper shank portion, said slot being in sliding cooperation with the upper shank portion of the screw.

4. A motor vehicle clutch assembly according to claim 1, wherein the means preventing relative rotation between the piston and the cylinder comprise second rotation stop means carried by the cylinder.

5. A motor vehicle clutch assembly according to claim 4, wherein the second rotation stop means comprise a sleeve member fixed to the cylinder.

6. A motor vehicle clutch assembly according to claim 5, wherein said sleeve member comprises a central sleeve portion extending into an interior of the piston and formed with at least one radial lug, the cylinder having a complementary internal slot cooperating with the said at least one lug.

7. A motor vehicle clutch assembly according to claim 1, wherein the cylinder is of stepped form, including a portion of reduced diameter defining a shouldered nose extending into an interior of said first bearing and abutting axially on the latter.

8. A motor vehicle clutch assembly according to claim 7, wherein said first bearing and cylinder portion of reduced diameter define a radial clearance between them.

9. A motor vehicle clutch assembly according to claim 8, wherein said first bearing is a rolling bearing having an inner bearing ring, and further including pre-loading resilient means bearing on the cylinder for maintaining the latter in axial abutment against the inner bearing ring of said first bearing and on a slide member being supported by the piston whereby to bias the piston in traction.

10. A motor vehicle clutch assembly according to claim 1, wherein the piston extends within the declutching means and cooperates with the inner bearing ring of said second bearing.

11. A motor vehicle clutch assembly according to claim 3, further comprising a radial flange formed at the free end of the cylinder and wherein said slot is formed in said flange.

12. A motor vehicle clutch assembly according to claim 5, wherein said sleeve comprises a radial flange which is secured to the free end of the cylinder.

13. A motor vehicle clutch assembly according to claim 7, wherein said control chamber is delimited axially by said shouldered nose and a slide member supported by the piston.

* * * * *